United States Patent [19]

Murabayashi et al.

[11] Patent Number: 5,761,180
[45] Date of Patent: Jun. 2, 1998

[54] SIGNAL PROCESSING FOR SELECTIVE TEMPORAL DATA RECORDING AND REPRODUCTION

[75] Inventors: Noboru Murabayashi, Saitama; Keitaro Yamashita, Kanagawa, both of Japan

[73] Assignee: Sony Corporation, Tokyo, Japan

[21] Appl. No.: 788,185

[22] Filed: Jan. 24, 1997

[30] Foreign Application Priority Data

Jan. 30, 1996 [JP] Japan ................... 8-034221

[51] Int. Cl.[6] ........................................... G11B 7/00
[52] U.S. Cl. ..................... 369/124; 369/47; 369/32; 369/60
[58] Field of Search .................... 369/124, 32, 60, 369/59, 47; 360/18; 386/1, 46, 95, 125, 126, 45

[56] References Cited

U.S. PATENT DOCUMENTS

5,371,551 12/1994 Logan et al. ................ 369/60
5,471,450 11/1995 Yonemitsu et al. ............ 369/60
5,511,054 4/1996 Oishi et al. ................... 369/60
5,587,978 12/1996 Endo et al. ................... 369/60

*Primary Examiner*—Nabil Hindi
*Attorney, Agent, or Firm*—Frommer Lawrence & Haug LLP; William S. Frommer

[57] ABSTRACT

A signal processing operation includes periodic recordation of information, such as television image and audio signals, on a recording medium. The information is recorded for a predetermined period of time provided that a signal level of the recorded image and audio signals exceeds a predetermined threshold. After the recording operation is completed, a recording standby state follows during which no recording is performed on the recording medium. The information contents are sufficiently understandable by carrying out the periodic recording operation while the hard disk can be efficiently utilized to provide additional recording space thereon.

19 Claims, 7 Drawing Sheets

SIGNAL PROCESSING FOR SELECTIVE TEMPORAL DATA RECORDING AND REPRODUCTION

BACKGROUND OF THE INVENTION

The invention is related to information signal processing and, in particular, an information recording/playback device for selectively recording television broadcast image and audio data, for example, on a recording medium such as a hard disc, such that the recorded image and audio data occupies less area on the recording medium providing longer recording time, while adequately enabling viewing of the recorded broadcast programs when replayed on a reproducing device.

With widespread use of a video cassette recorder (VCR), it is typical to record a broadcast television program, for example, and then play it back at any time convenient to a viewer. Using a reservation procedure prior to a recording operation, the recorded broadcast program can be replayed without any time restriction.

Quite often, however, the reservation procedure is time-consuming and complex, including the following steps: checking the broadcast contents, confrmning a broadcast channel and time of the program hopefully prior to the broadcast of the preferred program, and finally programming the VCR by inputting the required reservation information.

To avoid the above inconvenience, it is possible to record the complete program broadcast during a predetermined period of time which encompasses the program, such that the recorded information includes the program that the user wishes to see. With this procedure, however, the required amount of a recording medium becomes enormous and impractical, even if a high capacity storage device, such as an optical disc or hard disc, is used for recording the information. In addition, the program in interest must be laboriously searched for while viewing the complete recorded information during playback.

Another possibility is to compress image and audio signals for reducing data to be recorded on a large capacity hard disc, for example. It is apparent, however, that there are limits to the available storage area even in a hard disc with large storage capacity. To free up the disc space, redundant information should be deleted in order to extend the recordation time. Hardware for extracting redundant picture information from the compressed image and audio data is extremely complex and may be cost prohibitive.

A need therefore exists for a device that overcomes the above disadvantages. The present invention provides an information signal processing device and method for enabling the recordation of television broadcast programs, for example, for a longer period of time by selectively recording information on a recording medium.

OBJECTS OF THE INVENTION

It is an object of the invention to record and reproduce image and audio information received from a television broadcast by efficiently utilizing a recording medium.

It is another object of the invention to periodically record image and audio information on a recording medium.

It is a further object of the invention to record image and audio information received from more than one broadcast channel on a recording medium.

It is still another object of the invention to record image and audio information from multiple channels on a recording medium using time-division multiplexing.

It is yet another object of the invention to provide multiple periodic recording operations of image and audio information on a recording medium interspersed with multiple recording standby operations.

SUMMARY OF THE INVENTION

These and other objects, features and advantages are accomplished by signal processing for selective temporal data recording and reproduction. In accordance with one embodiment of the present invention, a signal processing device receives data including a first and second information carrying signal and selectively records and reproduces the two signals. The inventive device includes receiving means for receiving the data and selecting the two signals therefrom. Further included is storage means for selectively storing the first and second signals provided by the receiving means. The inventive device further includes detecting means for detecting whether the first and/or second signal has a signal level higher than a first predetermined threshold value. Also included is control means for controlling storage of the two signals in the storage means as a function of the detecting means. In one aspect of the present invention, the first and/or second signal is stored for a first predetermined period if the signal level is higher than the first predetermined threshold value, followed by a standby storing operation for a second predetermined period.

In accordance with another aspect of the present invention, the first and/or second signal is stored for the first predetermined period only if the signal level is higher than the first predetermined threshold value for the entire first predetermined period.

In accordance with yet another aspect of the present invention, the first and/or second signal is stored for a portion of the first predetermined period if the signal level is higher than the first predetermined threshold value only for that portion. In accordance with still another aspect of the present invention, the first and/or second signal is stored for another portion of the first predetermined period if the signal level is higher than the first predetermined threshold value for the second predetermined period of the standby storing operation immediately following the first predetermined period.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The invention will now be explained in detail with reference to the accompanying drawings.

Figure 1:
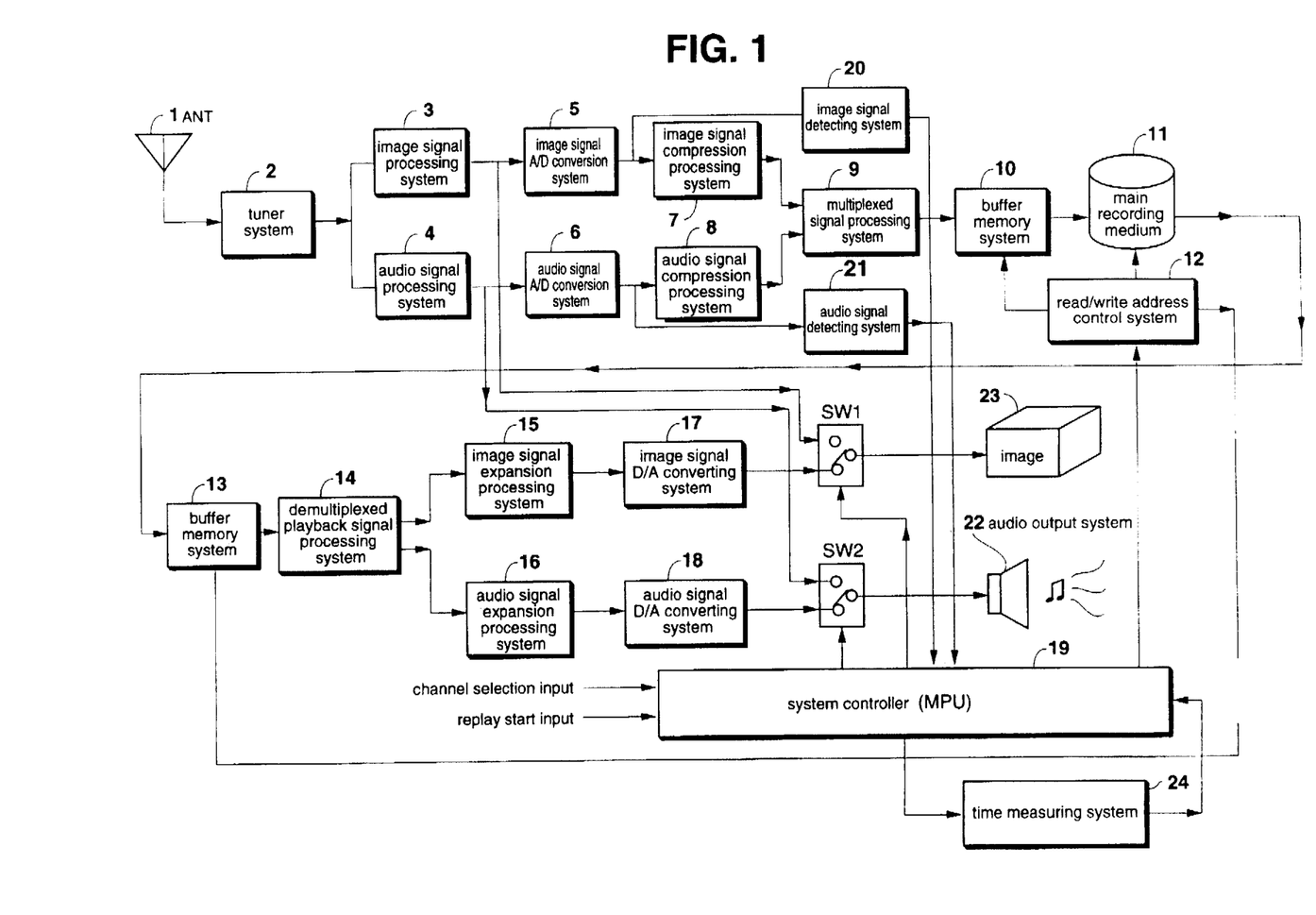
FIG. 1 is a block diagram of an information processing device according to one embodiment of the present invention.

FIG. 1 is a block diagram of an information processing device according to one embodiment of the present invention. Television broadcast signals are received by an antenna 1 such that a user-preferred program is selected by a tuner system 2 in response to user instructions. The selected signal from the tuner 2 is supplied to an image signal processing system 3 and an audio signal processing system 4 in which an image signal and an audio signal, respectively, are demodulated and amplified. Analog-to-Digital (A/D) conversion then takes place with respect to the image signal in an image signal A/D conversion system 5 using a representative quantization level of 8 bits and a sampling frequency of approximately 13.5 MHz. The output from the image signal A/D conversion system 5 is sent to an image signal detecting system 20 which selects an image signal satisfying a predetermined condition. Also, following the A/D conversion, the digitized image signal is then compressed in accordance with JPEG (Joint Picture Expert Group) or MPEG (Moving Pictures Expert Group) standard at an image signal compression processing system 7.

Similarly, the audio signal is converted from an analog to digital form using a representative quantization level of 10 bits and a sampling frequency of approximately 31.5 KHz. The digitized audio signal is then inputted to an audio signal compression processing system 8 for data compression in accordance with the MPEG standard, for example. The audio signal from the audio signal A/D conversion system 6 is also inputted to an audio signal detecting system 21, such that an audio signal can be selected which satisfies a predetermined condition, as will be explained below. The results of the image and audio detection operations are supplied to a system controller (MPU) 19 to control read/write operations of data stored on a main recording medium 11, as will be explained in detail hereinbelow.

As further shown in FIG. 1, the compressed image and audio signals are combined in a buffer memory system 10 after being processed by a multiplexed signal processing system 9. The image and audio data in the buffer memory system 10 is then recorded on the main recording medium 11 and may be replayed at any time as requested by a user. The main recording medium 11 may include a hard disc drive (HDD) or a large capacity semiconductor memory.

During a playback operation, the image and audio data is read from the main recording medium 11 and supplied to a demultiplexed playback signal processing system 14 via a buffer memory system 13. When a hard disc drive (HDD) is used as the main recording medium 11, the buffer memory systems 10 and 13 temporarily store data for performing read/write operations as instructed by the system controller 19 and a time measuring system 24 via a read/write address control system 12.

Continuing with the description of FIG. 1, the output from the demultiplexed playback signal processing system 14 is separated into two signals: image and audio. The image and audio signals are supplied, respectively, to an image signal expansion processing system 15 and an audio signal expansion processing system 16 which perform substantially the inverse operation of data compression in the recording operation. The image and audio signals substantially restored to their pre-compression form by the signal expansion processing systems 15 and 16 are then converted from a digital to analog domain by an image signal D/A converting system 17 and an audio signal D/A converting system 18.

Next, as shown in FIG. 1, switches SW1 and SW2 having two inputs and one output perform a switching operation between two types of image and audio signals. Either the playback image and audio signals from the D/A converting systems 17, 18 or direct broadcast image and audio signals from the processing systems 3, 4 which have not passed through the main recording medium 11 are selected by the switches SW1, SW2 in response to a control signal from the system controller 19. Following the appropriate selection, the output image signal from the switch SW1 is supplied to a display monitor 23 such that a previously recorded or a currently broadcast image may be displayed on a screen. The image display on the display monitor 23 is controlled by the system controller 19. Similarly, in response to the control signal from the system controller 19, a previously recorded audio information or currently broadcast audio information is supplied by the switch SW2 to an audio output system 22 for audio reproduction.

In one aspect of the present invention, a digest recording operation of a television program is accomplished utilizing little storage space on a recording medium. That is, according to the present invention a representative ten second recording period is set as a recording time unit. Only portions of the broadcast image and audio signals that satisfy certain predetermined conditions, as will be explained below, are recorded during that particular recording time unit of 10 seconds. After recording for 10 seconds during a particular recording time unit, a recording standby operation of a predetermined period is carried out. After the expiration of recording standby time, another recording operation is performed for the next recording time unit if the image and audio signals are within a predetermined level, for example. This alternating process of recording and standby operations continues until a stop instruction or any other terminating condition is encountered.

FIGS. 2A through 2D are timing diagrams for several recording operations in accordance with the present invention. Several different recording operations under various broadcast conditions are shown in the timing diagrams where the horizontal axis represents time.

Figure 2A:
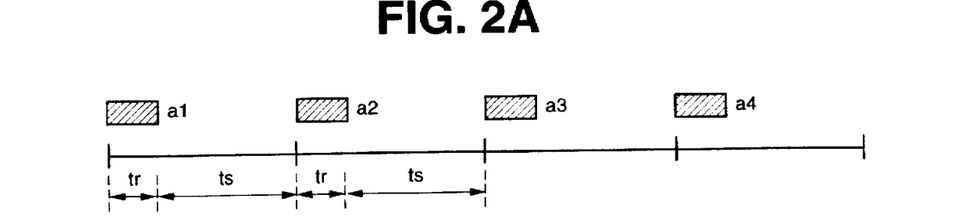
FIGS. 2A–2D are timing diagrams for a recording operation by an information processing device in accordance with the present invention.

FIG. 2A is the timing diagram for a recording operation under typical broadcast conditions. That is, this recording operation is performed when a broadcast program has continuous image and audio signals of greater than a predetermined amplitude level throughout the entire broadcast. A representative ten-second recording period is preset as a recording time unit tr, with one minute being set as a period ts (i.e., recording standby time) between the recording periods. First, as shown in FIG. 2A, a signal portion a1 is recorded during the recording time unit tr, i.e. representative ten seconds. When this recording operation is completed, the recording standby time ts of one minute, for example, is activated. When the one minute period ends, the recording operation is again carried out for another 10 seconds, i.e., a signal portion a2 corresponding to the recording time unit tr. By periodically performing such recording operations, the digest recording of the broadcast is obtained whose contents are adequate for viewing the recorded programs at playback time. A replay of the digest recording is easily carried out in a short period of time—depending, of course, on the recording time unit tr and the recording standby time ts—even when broadcast programs are recorded over a long period of time such as one day, for example.

Figure 2B:
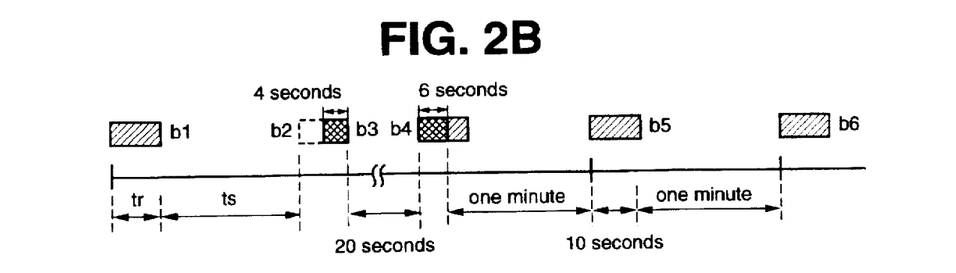

FIG. 2B shows the timing diagram for a recording operation in which the image or audio signal level is low in certain portions of the signal. In a first signal portion b1, the signal is within a predetermined level and is recorded as is during an exemplary recording time unit tr of ten seconds. After this operation, a representative recording standby period ts of one minute ensues. When the one-minute period of the recording standby time passes, a signal portion b2 has to be recorded next. The signal in this portion, however, cannot be recorded because the signal level is too low, i.e., less than the predetermined threshold value. The recording operation is therefore not carried out until the signal level greater than the threshold value appears in a signal portion b3. As shown in FIG. 2B, during this portion b3, the amplitude signal level exceeds the predetermined threshold value only for a fraction, such as 4 seconds for example, of the recording time unit tr. Consequently, the predetermined recording time unit tr of 10 seconds is not completed. In such a case, if the signal having a level greater than the threshold value appears during the ensuing recording standby time, that signal is recorded for the rest of the recording time unit to complete 10 seconds.

In particular, referring to FIG. 2B, after the signal portion b3 the recording operation is in the standby state and is not carried out for exemplary 20 seconds because the signal level is too low. When the signal exceeds the predetermined threshold value at a signal portion b4 during the recording standby time, the recording operation is carried out for 6 seconds, i.e., the time deficient in the previous recording operation of 4 seconds. Although the signal level above the predetermined threshold value continues in the portion b4 for more than six seconds, the image and/or audio signal is recorded only for the deficient six seconds. As a result, the recording operation in the portion b4 in combination with the previously recorded signal portion b3 is performed for the entire recording time unit tr of 10 seconds. After this, there is a recording standby time ts of one minute. Since this recording standby time follows the duration of the completed recording time unit of 10 seconds, signals appearing in this standby period are not recorded even if their levels exceed the predetermined threshold. The next recording operation is carried out when the signal at the portion b5 has a level greater than the predetermined threshold value. A digest recording is thus accomplished by periodically performing the recording operation as described above.

By using the digest recording of the present invention, no recording is carried out during those broadcast portions lacking a signal or with signals having a low amplitude level. Thus, the efficient and effective digest recording is achieved. This allows recording regions of the recording medium to be efficiently utilized such that the recording operation can be carried out for a longer period of time and for a larger number of programs when compared to a continuous recording operation. In the above description, the predetermined recording time unit tr is representatively set to 10 seconds while the predetermined recording standby time ts is one minute. It is understood, of course, that these times are exemplary only and can be arbitrarily and selectively established based on storage capacity and other considerations.

Figure 2C:
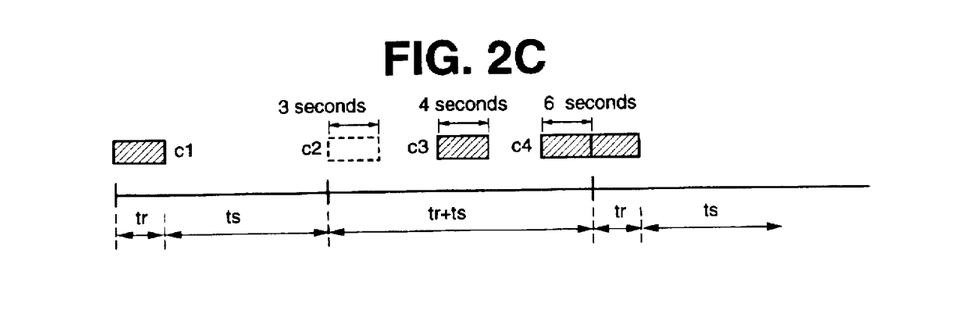

Another embodiment of the recording operation is also possible as shown in FIG. 2C noticing that in FIG. 2B a signal of small duration is present during the recording time unit tr. In this embodiment, signals in portions c3 and c4 having amplitude levels greater than the predetermined threshold value and continuing longer than a predetermined threshold period, such as 3 seconds for example, are recorded during the recording time unit tr and recording standby time ts. Conversely, the signal in the signal portion c3 that is shorter than the threshold duration period is not recorded even if the signal level exceeds the threshold amplitude value. The recording standby state is maintained until the next signal portion has a signal lasting four seconds or more during the time period represented by tr+ts, in which case the recording operation is restarted as long as the sum of the signal portions c3 and c4 does not exceed the recording time unit tr. Thereafter, if the signal portion c4 is followed by the next recording time unit in which the signal level is greater than the threshold level, the signal is again recorded.

Figure 2D:
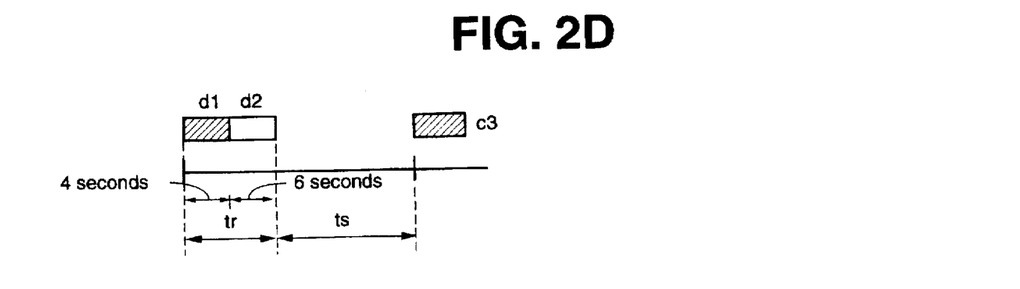

Further, even in a situation as shown in FIG. 2D, where a signal exceeds the threshold amplitude value in a portion d1 and then falls to an amplitude level that has not been recorded in the recording operations of FIGS. 2B and 2C, another way of recording is also possible. In this operation, the signal is continued to be recorded for the remaining six seconds in a signal portion d2. Hence, the recording operation is carried out for the entire ten seconds of the recording time unit tr even though the signal amplitude level is below the threshold value. The recording time unit tr is then followed by the recording standby time ts. In this type of recording, the program content sometimes becomes more easily understood when compared to the case where a signal portion at the beginning of the recording time unit tr is recorded with shortened period such as six or four seconds and then supplemented by recording a signal in a non-adjacent recording time unit.

Figure 3:
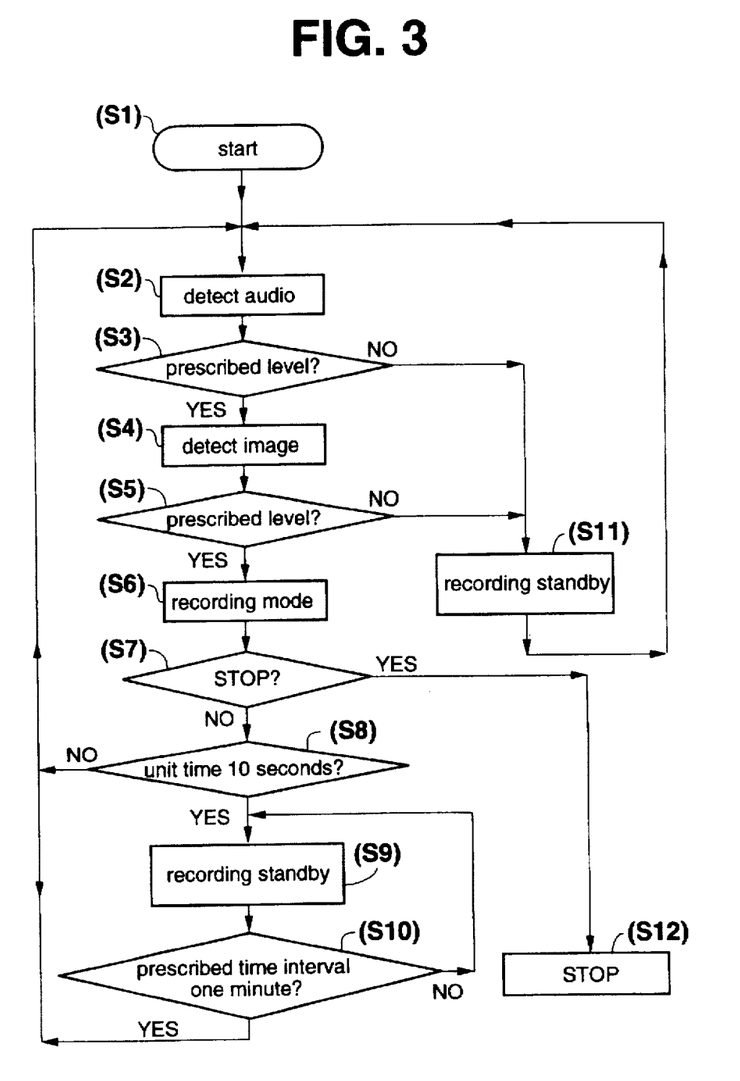
FIG. 3 is a sequencing flowchart for recording information signals in accordance with one embodiment of the present invention.

FIG. 3 is a flowchart of a signal processing operation according to the present invention for the case corresponding to FIG. 2B. That is, the recording operation is carried out so that any signal portion with a signal exceeding a threshold amplitude value is recorded irrespective of the signal duration until the sum of the recording periods equals the recording time unit. Following the start of processing in step S1, an audio signal is detected in step S2. In step S3, a determination is made whether the audio signal exceeds a threshold level. If the audio signal level is low, i.e., below the threshold, a recording standby state is carried out in step S11. Otherwise, i.e.,if the threshold level is exceeded by the audio signal, image signal detection is performed in step S4. Next, a determination is made in step S5 whether the image signal level is greater than a threshold value. If the image signal level exceeds the threshold, then a recording operation begins in step S6. Otherwise, i.e., if the threshold level is not exceeded by the image signal, the recording standby operation is performed in step S11 and the processing is returned to the beginning of the flowchart.

In step S7, it is determined whether a stop instruction for the recording operation has been entered by a user. The recording operation is terminated in step S12 if the stop instruction has been activated. Otherwise, a determination is made in step S8 whether the recording operation has been carried out for the full recording time unit, such that the processing is returned to step S2 if this is not the case. When the end of the recording time unit has been reached, the processing continues with step S9 in which the recording standby state is activated. Following the activation of the recording standby state, a determination is made in step S10 whether a predetermined time period has ended in the recording standby state. If so, the processing is returned to the beginning of the operation and continues with step S2. Otherwise, i.e.,the determination in step S10 indicates that the recording standby time has not elapsed, the recording standby state continues with the processing in step S9.

Figure 4:
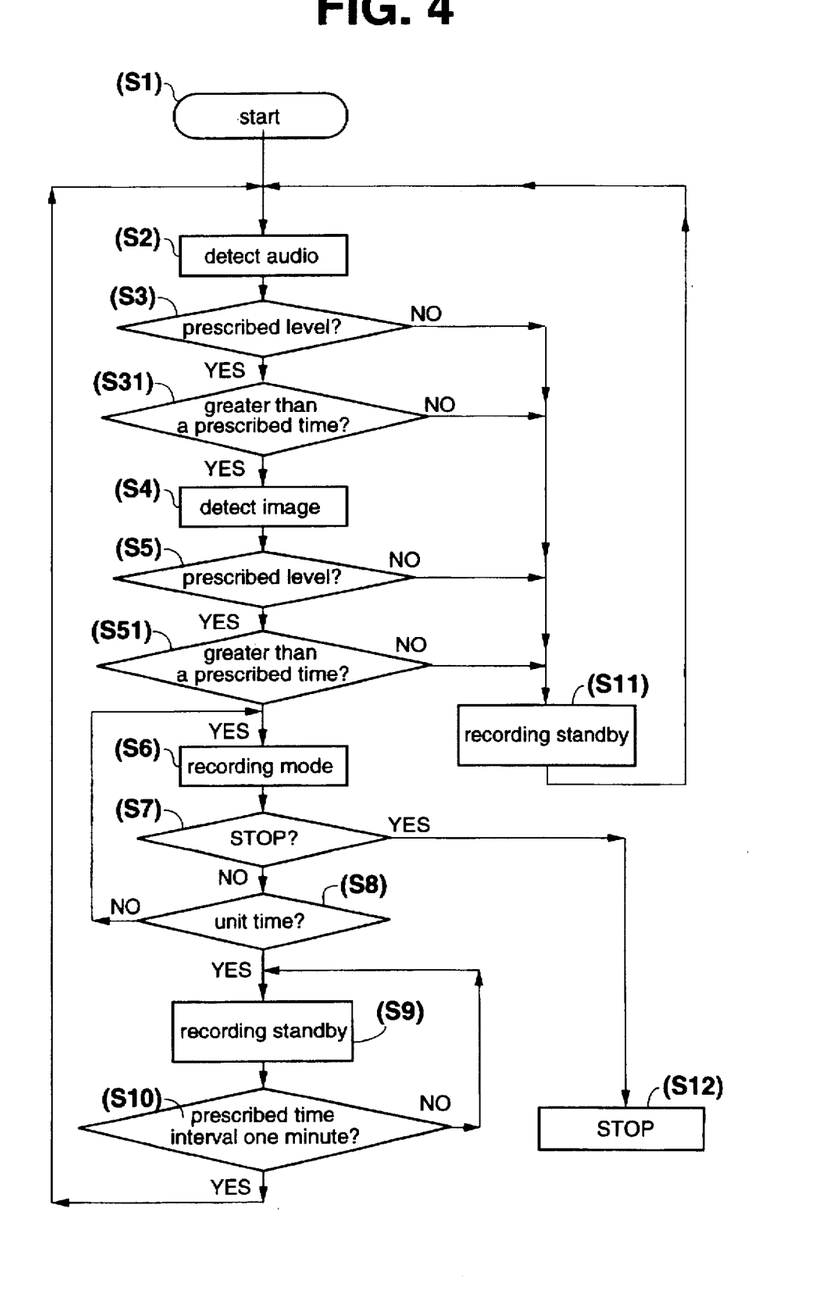
FIG. 4 is a sequencing flowchart for recording information signals in accordance with another embodiment of the present invention.

FIG. 4 is the flowchart for a signal processing operation corresponding to the timing diagram of FIG. 2C where the recording operation is performed not only when a signal level exceed a predetermined threshold value but also when the signal in that signal portion is longer in duration than a predetermined threshold period. The signal processing operation in FIG. 4 is substantially similar to the operation of FIG. 3 with identically labelled steps representing the same operations in the two flowcharts. Hence, a complete description of FIG. 4 is omitted to avoid redundancy. It is noted, however, that a difference between the two flowcharts resides in additional steps S31 and S51 of FIG. 4. That is, no recording operation is carried out if an audio or image signal portion is less than the threshold period. As stated earlier, this flowchart corresponds to the timing diagram of FIG. 2C.

Figure 5:
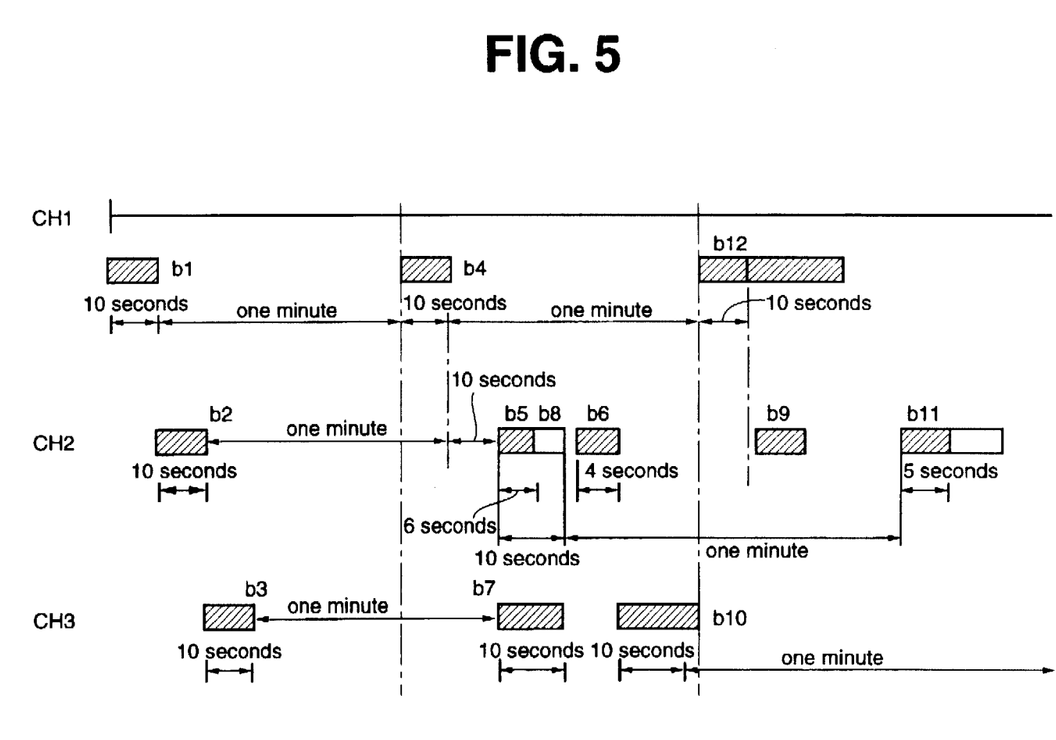
FIG. 5 is a timing diagram for a recording operation of several programs which are broadcast via several channels in accordance with yet another embodiment of the present invention.

FIG. 5 is a timing diagram for a recording operation of several programs which are broadcast via several channels in accordance with another embodiment of the present invention. For clarity, the recording operation of only three program channels has been presented in this example. Obviously, a recording operation of two channels or more than three channels is possible using the sequence of steps, as described next, extended to applicable channels.

The recording operation for each of the channels substantially follows the flowchart of FIG. 3 or FIG. 4 as described above pertaining to the single channel recording. In this example, however, signals from three channels are recorded on the recording medium. Namely, as shown in FIG. 5, the signals in channels CH1, CH2 and CH3 to be recorded as signal portions b1, b2 and b3, respectively, during the recording time unit tr are temporally shifted. Hence, the signal portions b1, b2 and b3 are recorded using a time-division multiplexing procedure.

Figure 6:
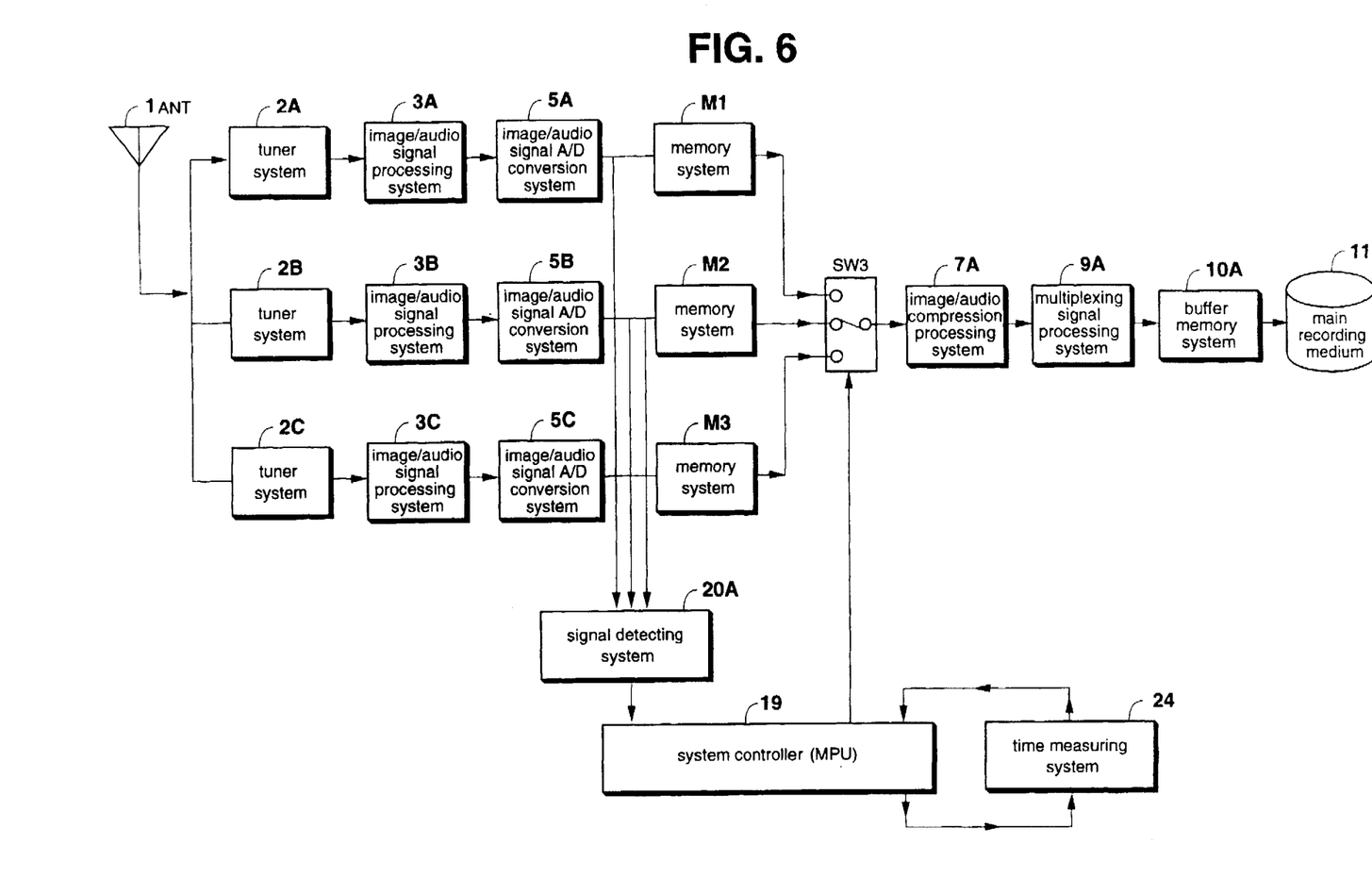
FIG. 6 is a block diagram of an information processing device which may be used for the recording operation as illustrated in the timing diagram of FIG. 5.

It is possible, however, that certain complications may arise with the above multi-channel recording operation. As shown in FIG. 5, after the exemplary recording standby time ts of one minute, signal portions b5 and b7 in the channels CH2 and CH3, respectively, overlap in time. In such a case, the processing operation can be carried out without any problem if the signal portions b5 and b7 are temporarily stored in a memory system of the device and then recorded on the main recording medium 11 using time-division multiplexing. A block diagram of an exemplary signal processing device for the multi-channel recording is shown in FIG. 6. Although this figure shows only the block diagram for the recording system, it is understood that the digest playback operation is performed in substantially the same way as described in FIG. 1.

In FIG. 6, an antenna 1 is connected to tuner systems 2A, 2B, 2C which individually receive the respective broadcast programs. Outputs from the tuner systems 2A, 2B, 2C are supplied to image/audio signal processing systems 3A, 3B, 3C, respectively, whose output signals are, in turn, supplied to memory system M1, M2, M3, respectively, after passing through image/audio signal A/D conversion systems 5A, 5B, 5C, respectively. The memory systems M1, M2, M3 temporarily store image/audio data when the signal portions, such as b5 and b7, overlap each other as illustrated in FIG. 4. A signal detection system 20A detects an image and audio signal for each channel and supplies the detected signal portions to the system controller 19. A switch SW3 selects output signals from the memory systems M1, M2, M3. The switching operation is controlled by the system controller 19 as a function of a time measuring operation by the time measuring system 24. When the signal recording periods overlap, signals during those recording periods are time-shifted with respect to each other using the switch SW3. The shifted signals are then stored in the main recording medium 11 after passing through the image/audio compression processing system 7A, the multiplexing signal processing system 9A and the buffer memory system 10A, as directed by the system controller 19.

In the immediately preceding embodiment of the present invention, multiple tuner systems are provided for multi-channel recording, while in the following embodiment several programs are selected and recorded using time-division multiplexing and a single tuner system of FIG. 1. According to this embodiment, when signals in the three channels of FIG. 5, for example, have to be recorded, priorities are assigned to these channels for selection by the tuner system. As an example, a channel with a small channel number is given higher priority for signal processing than the other channels. After completion of subsequent predetermined recording standby periods, a channel with a lower priority is then assigned a higher priority, such that a processing operation is carried out in such a manner that each channel has, on average, substantially the same level of priority.

In the example of FIG. 5, while the signal portions b5 and b7 in the channels CH2 and CH3, respectively, overlap with each other, by processing the signal in the channel CH2 having a higher priority due to a smaller channel number, the recording operation is carried out for a representative recording time unit tr of 10 seconds that includes the signal portions b5 and b8. In the recording operation during this recording time unit which includes signal portions b5 and b8, a signal portion b7 in the channel CH3 has not been included such that a signal in the signal section b7 is not recorded. Thereafter, a signal in a signal portion b10 is recorded following the signal portion b7, because the signal portion b10 is the next portion after b7 available for recording following the expiration of the recording standby period for channel CH3. Next, a signal in a signal portion bl2 in the channel CH1 that does not overlap with any other signal is then recorded. In the meantime, in the channel CH2, signals in signal portions b6 and b9 are not recorded because the recording standby period has not passed yet following the recording operation of the signal portion b5, b8 during the recording time unit in that channel. As a result, a signal in a signal portion b11 is recorded because it is the initial signal portion after the recording standby time has elapsed following the previous recording time unit. By continuously performing the above signal processing operation via switching between the channels, the digest recording operation for more than one channel is efficiently carried out using only one tuner system.

Figure 7:
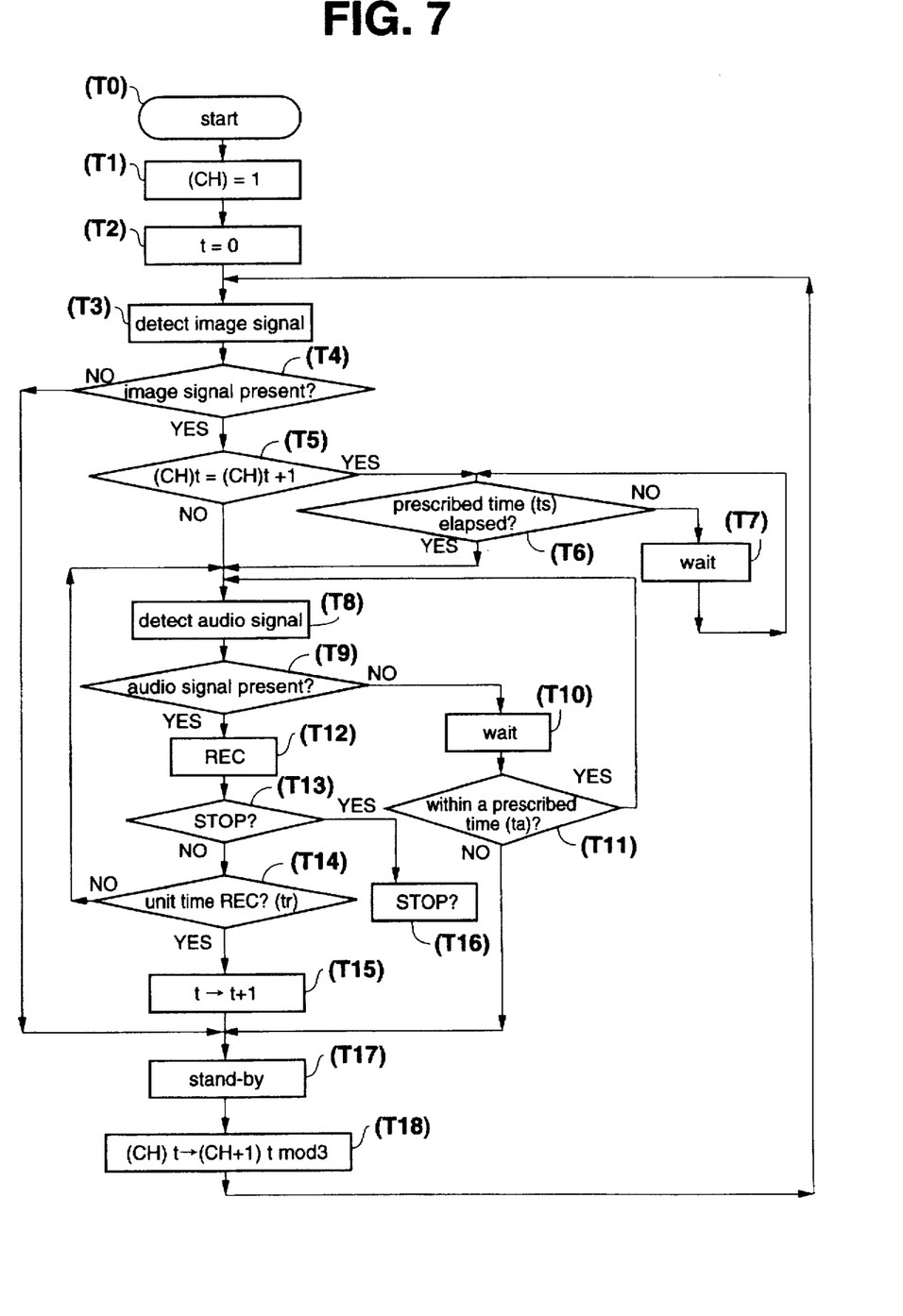
FIG. 7 is a sequencing flowchart for processing signals which are broadcast via several channels according to the embodiment of the present invention.

FIG. 7 is a sequencing flowchart for the above multi-channel signal recording operations. Following the start in step T0, a channel is set to one, for example, i.e.,(CH) =1, in step T1. Then, in step T2, a variable t is initialized, i.e.,t=0, representing the count for recording operations in order to determine the sequencing order for the recording time unit tr. Image signal detection is then carried out in step T3, followed by a determination in step T4 whether the image signal has a recordable level, i.e.,exceeds the threshold value. When the image signal level is not recordable, a recording standby state is entered in step T17 bypassing processing steps T5 through T15. In this case, after the current channel is updated as (CH)t=(CH+1)t in step T18, the processing returns to step T3 in order to detect a signal portion, which is suitable for recordation, in the updated channel.

If in step T4 the signal level is greater than the threshold value, a determination is made in step T5 whether a pending recording operation is set to take place from the channel for which the preceding recording operation was performed. This is to determine whether a signal can be recorded subsequent to the previous recording operation in the same channel. If, as determined in step T5, the pending recording process follows the preceding recording operation in the same channel, a determination is made in step T6 whether a predetermined recording standby period ts has ended after the recording time unit tr. If this recording standby period has not been completed, the process enters a wait state in step T7 and loops back to the processing in step T6 until the recording standby period is completed.

On the other hand, if it is determined in step T6 that the recording standby period has ended in the same channel, or the processing in step T5 indicates that the pending recording operation is scheduled for a different channel, i.e., "NO" branch is taken from step T5, an audio signal is detected in step T8. Following the detection of the audio signal, and if its signal level is sufficient based on a decision in step T9, a recording state is entered in step T12. If the audio level is determined in step T9 to be insufficient for recordation, the processing enters a wait state in step T10. In this case, when a sufficient level of the audio signal is not detected during a representative time period ta such that ta>ts, the process proceeds to step T17 in order to set the next channel for the next recording operation.

During the recording operation in step T12, a determination is made in step T13 whether a stop instruction has been inputted. If so, the recording operation is terminated in step T16. Otherwise, i.e.,the stop input is not present, a determination is made in step T14 regarding the recording time unit tr, i.e.,whether the recording time unit has been completed. If not, the recording operation continues via a loop. On the other hand, if the recording operation has been completed for the entire recording time unit tr, the variable t is incremented, i.e., t=t+1, in step T15 such that the count t is prepared for the subsequent recording operation. Then, a recording standby state is entered in step T17, followed by the channel update, i.e.,(CH)t=(CH+1)t mod 3 in step T18. In this example, since the number of channels is 3, the channel number is incremented using modulo 3 to maintain the channel number within the range 1–3. According to the present invention, a digest recording operation of broadcast programs is achieved such that the storage capacity of a main storage medium, i.e.,a hard disc, can be efficiently utilized to allow information signals to be recorded over a longer period of time. Furthermore, a playback operation of the recorded information ensures that the contents of the broadcast programs are sufficiently understandable and have little redundancy.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A signal processing device for receiving data including a first information carrying signal and a second information carrying signal and for selectively recording and reproducing said first and second signals, comprising:

receiving means for receiving said data and selecting said first and second signals from said data;

storage means for selectively storing said first and second signals provided by said receiving means;

detecting means for detecting whether a signal selected from said first and second signals has a signal level higher than a first predetermined threshold value; and control means for controlling storage of said first and second signals in said storage means as a function of said detecting means, wherein said signal selected from said first and second signals is stored for a first predetermined period if said signal level is higher than said first predetermined threshold value, followed by a standby storing operation for a second predetermined period.

2. The device according to claim 1, wherein said signal selected from said first and second signals is stored for said first predetermined period only if said signal level is higher than said first predetermined threshold value for the entire first predetermined period.

3. The device according to claim 1, wherein said signal selected from said first and second signals is stored for a portion of said first predetermined period if said signal level is higher than said first predetermined threshold value only for said portion of said first predetermined period.

4. The device according to claim 3, wherein said signal selected from said first and second signals is stored for a remaining portion of said first predetermined period if said signal level is higher than said first predetermined threshold value during said second predetermined period of said standby storing operation immediately following said first predetermined period.

5. The device according to claim 1, wherein said first and second signals are an image signal and audio signal, respectively.

6. The device according to claim 1, wherein said data includes a plurality of signals in addition to said first and second signals, said receiving means comprising a plurality of means for additionally selecting at least a third signal and a fourth signal from said plurality of signals for storing in said storage means.

7. The device according to claim 6, further comprising means for temporarily storing said first and second signals if they temporally overlap with said third and fourth signals during the receiving operation.

8. The device according to claim 7, wherein said first, second, third and fourth signals are stored in said storage means using time-division multiplexing.

9. The device according to claim 1, further comprising playback means for reproducing from said storage means said first and second signals.

10. The device according to claim 9, wherein said playback means includes switching means connected to said control means and receiving said first and second signals prior to storage and subsequent to storage, said switching means switching between said stored and non-stored first and second signals in response to said control means.

11. The device according to claim 10, further comprising time measuring means for providing timing signals to said control means to control the switching operation of said switching means.

12. The device according to claim 1, wherein said detecting means further detects whether said signal selected from said first and second signals has signal duration longer than a second predetermined threshold value.

13. A signal processing method for receiving data including a first information carrying signal and a second information carrying signal and for selectively recording and reproducing said first and second signals, said method comprising the steps of:

receiving said data;

selecting said first and second signals from said data;

selectively storing said selected first and second signals;

detecting whether a signal selected from said first and second signals has a signal level higher than a first predetermined threshold value; and controlling storage of said first and second signals as a function of said detecting step, wherein said signal selected from said first and second signals is stored for a first predetermined period if said signal level is higher than said first predetermined threshold value, followed by a standby storing operation for a second predetermined period.

14. The method according to claim 13, wherein said signal selected from said first and second signals is stored for said first predetermined period only if said signal level is higher than said first predetermined threshold value for the entire first predetermined period.

15. The method according to claim 13, wherein said signal selected from said first and second signals is stored for a portion of said first predetermined period if said signal level is higher than said first predetermined threshold value only for said portion of said first predetermined period.

16. The method according to claim 15, wherein said signal selected from said first and second signals is stored for a remaining portion of said first predetermined period if said signal level is higher than said first predetermined threshold value during said second predetermined period of said standby storing operation immediately following said first predetermined period.

17. The method according to claim 13, wherein said data includes a plurality of signals in addition to said first and second signals, and further additionally selecting at least a third signal and a fourth signal from said plurality of signals for the storing operation.

18. The method according to claim 17, further comprising temporarily storing said first and second signals if they temporally overlap with said third and fourth signals during the receiving operation.

19. The method according to claim 18, wherein said first, second, third and fourth signals are stored using time-division multiplexing.

* * * * *